US011053010B2

(12) United States Patent
Bruno et al.

(10) Patent No.: US 11,053,010 B2
(45) Date of Patent: Jul. 6, 2021

(54) AIRCRAFT ENVIRONMENTAL CONTROL SYSTEM

(71) Applicant: Hamilton Sundstrand Corporation, Charlotte, NC (US)

(72) Inventors: Louis J. Bruno, Ellington, CT (US); Thomas M. Zywiak, Southwick, MA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 436 days.

(21) Appl. No.: 15/987,590

(22) Filed: May 23, 2018

(65) Prior Publication Data

US 2019/0225343 A1 Jul. 25, 2019

Related U.S. Application Data

(60) Provisional application No. 62/619,459, filed on Jan. 19, 2018.

(51) Int. Cl.
*B64D 13/06* (2006.01)
*F25B 9/00* (2006.01)

(52) U.S. Cl.
CPC ...... *B64D 13/06* (2013.01); *B64D 2013/0618* (2013.01); *B64D 2013/0648* (2013.01);
(Continued)

(58) Field of Classification Search
CPC . Y02T 50/50; F25B 9/004; B64D 2013/0618; B64D 2013/0648; B64D 2013/0662
See application file for complete search history.

(56) References Cited

U.S. PATENT DOCUMENTS

| 4,261,416 A | 4/1981 | Hamamoto |
| 5,442,905 A | 8/1995 | Claeys et al. |

(Continued)

FOREIGN PATENT DOCUMENTS

| DE | 10234968 A1 * | 2/2004 | ............. F25B 9/004 |
| EP | 1386837 A1 | 2/2004 | |

(Continued)

OTHER PUBLICATIONS

Extended European Search Report; International Application No. 19152829.8-1010; International Filing Date: Jan. 21, 2019; dated May 7, 2019; 36 pages.

(Continued)

*Primary Examiner* — Ana M Vazquez
(74) *Attorney, Agent, or Firm* — Cantor Colburn LLP

(57) ABSTRACT

An environmental control system of an aircraft includes a ram air circuit including a ram air shell having at least one heat exchanger positioned therein, a dehumidification system arranged in fluid communication with the ram air circuit, and a compressing device arranged in fluid communication with the ram air circuit and the dehumidification system. The compression device includes a compressor and a first turbine coupled to one another via a shaft. During operation of the first turbine, work is extracted from a first medium within the first turbine to power the compressor. At an outlet of the first turbine, a temperature of the first medium is above freezing and at least a portion of the moisture within the first medium is condensed.

19 Claims, 5 Drawing Sheets

(52) U.S. Cl.
CPC ............... *B64D 2013/0662* (2013.01); *B64D 2013/0685* (2013.01); *F25B 9/004* (2013.01)

(56) References Cited

U.S. PATENT DOCUMENTS

| | | | |
|---|---|---|---|
| 5,461,882 A | 10/1995 | Zywiak et al. | |
| 5,887,445 A * | 3/1999 | Murry | B64D 13/06 62/402 |
| 9,669,936 B1 | 6/2017 | Fiterman et al. | |
| 2001/0004837 A1 | 6/2001 | Sauterleute | |
| 2002/0088245 A1 | 7/2002 | Sauterleute et al. | |
| 2008/0110193 A1* | 5/2008 | Jonqueres | B64D 13/06 62/331 |
| 2016/0083100 A1 | 3/2016 | Bammann et al. | |

FOREIGN PATENT DOCUMENTS

| | | |
|---|---|---|
| EP | 2998224 A1 | 3/2016 |
| EP | 3248878 A1 | 5/2017 |
| EP | 3489142 A1 | 11/2018 |
| JP | 2004142501 A | 5/2004 |

OTHER PUBLICATIONS

European Office Action; International Application No. 19152829.8-1010; International Filing Date: Jan. 21, 2019; dated May 4, 2020; 24 pages.

* cited by examiner

AIRCRAFT ENVIRONMENTAL CONTROL SYSTEM

CROSS-REFERENCE TO RELATED APPLICATIONS

This application claims benefit of priority to U.S. Provisional Application No. 62/619,459 filed Jan. 19, 2018, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards smaller systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches alone provides limited efficiency with respect to engine fuel burn.

BRIEF DESCRIPTION

According to an embodiment, an environmental control system of an aircraft includes a ram air circuit including a ram air shell having at least one heat exchanger positioned therein, a dehumidification system arranged in fluid communication with the ram air circuit, and a compressing device arranged in fluid communication with the ram air circuit and the dehumidification system. The compression device includes a compressor and a first turbine coupled to one another via a shaft. During operation of the first turbine, work is extracted from a first medium within the first turbine to power the compressor. At an outlet of the first turbine, a temperature of the first medium is above freezing and at least a portion of the moisture within the first medium is condensed.

In addition to one or more of the features described above, or as an alternative, in further embodiments a second medium is provided to the compressor and during operation of the environmental control system in a first mode, a mixture including at least a portion of the second medium output from the compressor and the first medium output from the first turbine is provided to the dehumidification system.

In addition to one or more of the features described above, or as an alternative, in further embodiments the compression device further comprises a second turbine arranged in fluid communication with the dehumidification system.

In addition to one or more of the features described above, or as an alternative, in further embodiments during operation of the environmental control system in the first mode, the mixture output from the dehumidification system is provided to the second turbine.

In addition to one or more of the features described above, or as an alternative, in further embodiments the environmental control system is operable in the first mode when the aircraft is on the ground or at low altitude.

In addition to one or more of the features described above, or as an alternative, in further embodiments comprising an expansion device located separate from the compression device and arranged in fluid communication with the ram air circuit and the dehumidification system.

In addition to one or more of the features described above, or as an alternative, in further embodiments the expansion device further comprises another turbine operably coupled to a fan by another shaft, the fan being located within the ram air shell such that operation of the fan moves air through the ram air circuit.

In addition to one or more of the features described above, or as an alternative, in further embodiments during operation of the environmental control system in the first mode, another portion of the second medium is provided to the expansion device and then to the dehumidification system, wherein within the dehumidification system, the another portion of the second medium is arranged in a heat exchange relationship with the mixture.

In addition to one or more of the features described above, or as an alternative, in further embodiments during operation of the environmental control system, the another portion of the second medium is output from the dehumidification system overboard.

In addition to one or more of the features described above, or as an alternative, in further embodiments during operation of the environmental control system, the another portion of the second medium is output from the dehumidification system into the ram air circuit.

In addition to one or more of the features described above, or as an alternative, in further embodiments comprising a first bypass valve associated with the expansion device, wherein during operation of the environmental control system in a second mode, the first bypass valve is open such that at least a portion of the second medium output from the compressor bypasses the expansion device and the dehumidification system.

In addition to one or more of the features described above, or as an alternative, in further embodiments during operation of the environmental control system in the second mode, the first medium and the second medium are mixed prior to being distributed to a downstream load.

In addition to one or more of the features described above, or as an alternative, in further embodiments comprising a second bypass valve associated with the first turbine of the compression device, wherein during operation of the environmental control system in the third mode, the second bypass valve is open such that at least a portion of the first medium is provided from the ram air circuit directly to the dehumidification system.

In addition to one or more of the features described above, or as an alternative, in further embodiments during operation of the environmental control system in the third mode, another portion of the first medium is provided from the ram air circuit to the first turbine, wherein the portion of the first medium and the another portion of the first medium rejoin at a location upstream from the dehumidification system.

In addition to one or more of the features described above, or as an alternative, in further embodiments comprising a third bypass valve arranged downstream from an outlet of the second turbine.

In addition to one or more of the features described above, or as an alternative, in further embodiments wherein during operation of the environmental control system in a fourth mode, the third bypass valve is open such that the first medium output from the second turbine flows through the third bypass valve and is dumped overboard or into the ram air circuit.

In addition to one or more of the features described above, or as an alternative, in further embodiments during operation of the environmental control system in the fourth mode, only the second medium is provided to a downstream load.

In addition to one or more of the features described above, or as an alternative, in further embodiments the compression device further comprises a power turbine coupled to the shaft, the environmental control system being operable in a plurality of modes such that in at least one mode, a third medium is provided to the power turbine.

In addition to one or more of the features described above, or as an alternative, in further embodiments wherein the first medium is bleed air, the second medium is fresh air, and the third medium is cabin discharge air.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
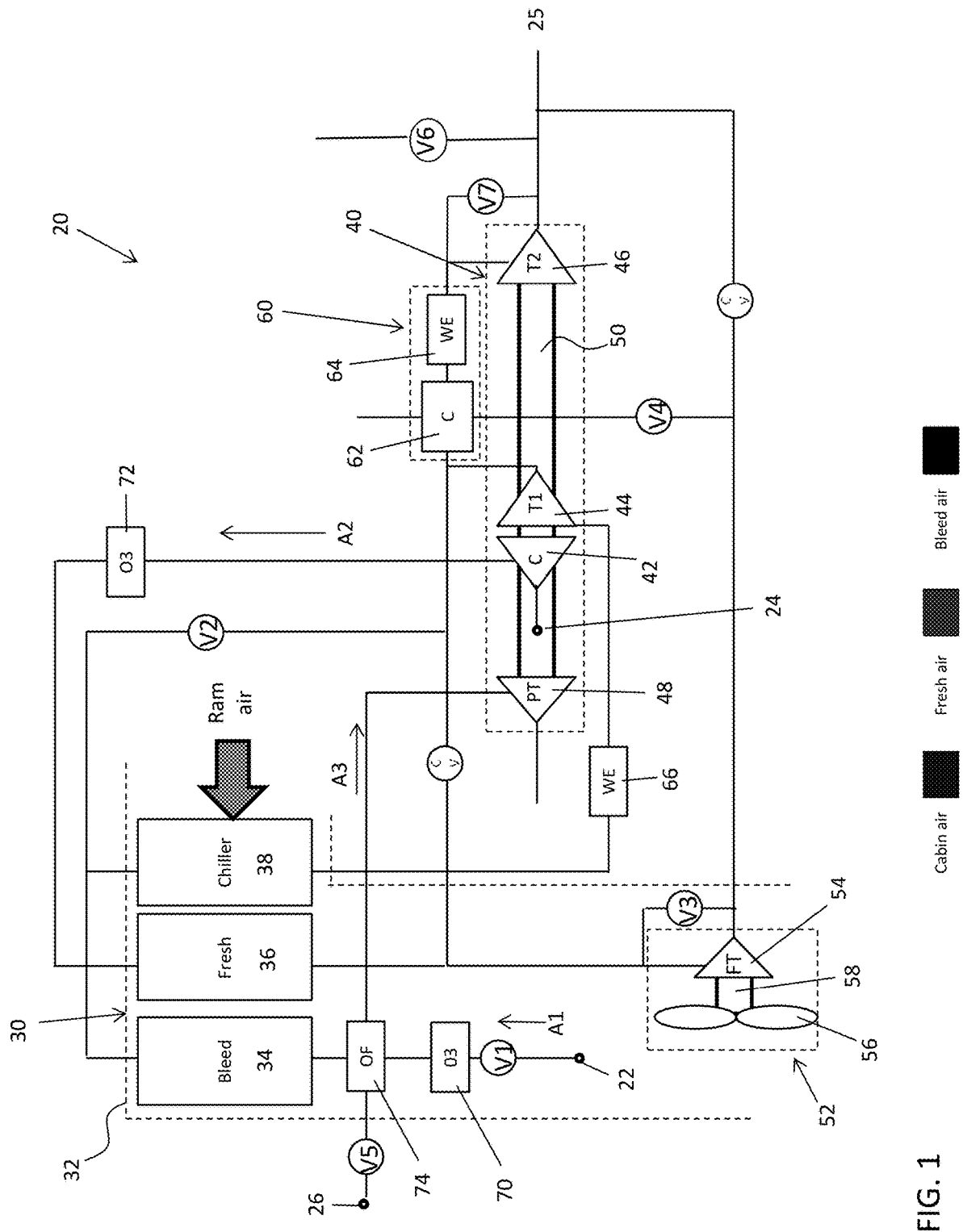
FIG. 1 is a simplified schematic of a system according to an embodiment.

With reference now to FIG. 1, a schematic diagram of a portion of an environment control system (ECS) 20, such as a pack for example, is depicted according to non-limiting embodiments. Although the environmental control system 20 is described with reference to an aircraft, alternative applications are also within the scope of the disclosure. As shown in the FIG., the system 20 can receive a first medium A1 at a first inlet 22. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 also receives a second medium A2 at an inlet 24 and may provide a conditioned form of at least one of the first medium A1 and the second medium A2 to a volume 25. In an embodiment, the second medium A2 is fresh air, such as outside air for example. The outside air can be procured via one or more scooping mechanisms, such as an impact scoop or a flush scoop for example. Thus, the inlet 24 can be considered a fresh or outside air inlet. Generally, the fresh air A2 described herein is at an ambient pressure equal to an air pressure outside of the aircraft when the aircraft is on the ground, and is between an ambient pressure and a cabin pressure when the aircraft is in flight.

The system 20 can further receive a third medium A3 at an inlet 26. In one embodiment, the inlet 26 is operably coupled to a volume 25 is the cabin of an aircraft and the third medium A3 is cabin discharge air, which is air leaving the volume that would typically be discharged overboard. In some embodiments, the system 20 is configured to extract work from the third medium A3. In this manner, the pressurized air A3 of the volume can be utilized by the system 20 to achieve certain operations.

The environmental control system 20 includes a RAM air circuit 30 including a shell or duct, illustrated schematically in broken lines at 32, within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first heat exchanger 34, a second heat exchanger 36, and a third heat exchanger 38. Within the heat exchangers 34, 36, 38, ram air, such as outside air for example, acts as a heat sink to cool a medium passing there through, for example the first medium A1 and/or the second medium A2.

The system 20 additionally comprises at least one compression device 40. In the illustrated, non-limiting embodiment, the compression device 40 of the system 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of the compression device 40 include an air cycle machine, a three-wheel air cycle machine, a four-wheel air cycle machine, etc.

As shown, the compression device 40 includes a compressor 42, a first turbine 44, a second turbine 46, and a power turbine 48 operably coupled to each other via a shaft 50. The compressor 42 is a mechanical device that raises a pressure of a medium and can be driven by another mechanical device (e.g., a motor or a medium via a turbine).

Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The first turbine 44, the second turbine 46, and the power turbine 48 are mechanical devices that expand a medium and extract work therefrom (also referred to as extracting energy). In the compression device 40, the turbines 44, 46, and 48 drive the compressor 42 via the shaft 50.

The system 20 additionally comprises at least one expansion device 52. The expansion device 52 is a mechanical device, similar to the compression device 40, and includes components for performing thermodynamic work on a medium (e.g., extracts work from or applies work to the second medium A2 by raising and/or lowering pressure and by raising and/or lowering temperature). Examples of the expansion device 52 include, but are not limited to, a simple air cycle machine or a tip turbine fan etc.

In the illustrated, non-limiting embodiment, the expansion device 52 is a two-wheel air cycle machine including a turbine 54 and a fan 56 operably coupled via a shaft 58. However, it should be understood that any suitable expansion device, including an air cycle machine having any number of wheels (i.e. three-wheel or four-wheel) are also within the scope of the disclosure. The turbine 54 is a mechanical device that expands a medium and extracts work therefrom. In the expansion device 52, the turbine 54 drives rotation of the fan 56 via the shaft 58. In a non-limiting embodiment, the turbine 54 can comprise a nozzle configured to accelerate a medium supplied thereto for entry into a turbine impeller (not shown). The fan 56 is a mechanical device that can force via push or pull methods a medium (e.g., ram air) through the shell 32 across the one or more ram heat exchangers 34, 36, 38 and at a variable cooling to control temperatures.

The system 20 additionally includes a dehumidification system 60. In the illustrated, non-limiting embodiment of FIG. 1, the dehumidification system 60 includes a condenser 62 and a water extractor 64 arranged downstream from the condenser 62. The condenser 62 and the water extractor 64 are arranged in fluid communication with the first medium A1, and in some embodiments with both the first medium A1 and the second medium A2. The condenser 62 is a particular type of heat exchanger and the water collectors 64 is a mechanical device that performs a process of removing water from a medium. The configuration of the at least one dehumidification system 60 may vary. In an embodiment, the dehumidification system 60 includes an additional water extractor 66 associated with the first medium A1 and located at a position upstream from the first turbine 44. Further, operation of the first turbine may contribute to dehumidification of the first medium received therein.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 is configured to control a supply of the first medium A1 to the system 20. A second valve V2 may be operable to allow a portion of a medium, such as the first medium A1, to bypass the first turbine 44 of the compression device 40. As a result, operation of the second valve V2 may be used to add heat and to drive the compression device 40 during failure modes. The third valve V3 may be operable to allow a portion of the second medium A2 to bypass the expansion device 52, and is therefore configured to control the speed of the ram fan and to provide compressor surge control. Operation of a fourth valve V4 is used to control the amount of the second medium entering the condenser for ground and low altitude flight conditions. On moderate temperature days on the ground, the valve V4 may be partially or fully closed. Further, valve V4 is typically closed at altitude. The fifth valve V5 is configured to control a supply of a third medium provided to the power turbine 48. Valve V6 may be configured to direct a supply of conditioned first medium, downstream from the outlet of the second turbine 46 overboard or to the ram air circuit 30 and valve V7 may be configured to allow a portion of a medium output from the dehumidification system 60 to bypass the second turbine 46 of the compression device 40.

The system 20 is operable in a plurality of modes, selectable based on a flight condition of the aircraft. For example, the system 20 may be operable in a first mode when the aircraft is on the ground or at a low altitude and the system may be operable in a second mode when the aircraft is at altitude or in a cruise condition. Operation in a third mode may occur in the event of a failure of a portion of the environmental control system. Similarly, the system may be operable in a fourth mode when 100% fresh air is to be provided to the one or more loads such as the cabin for example.

Figure 2:
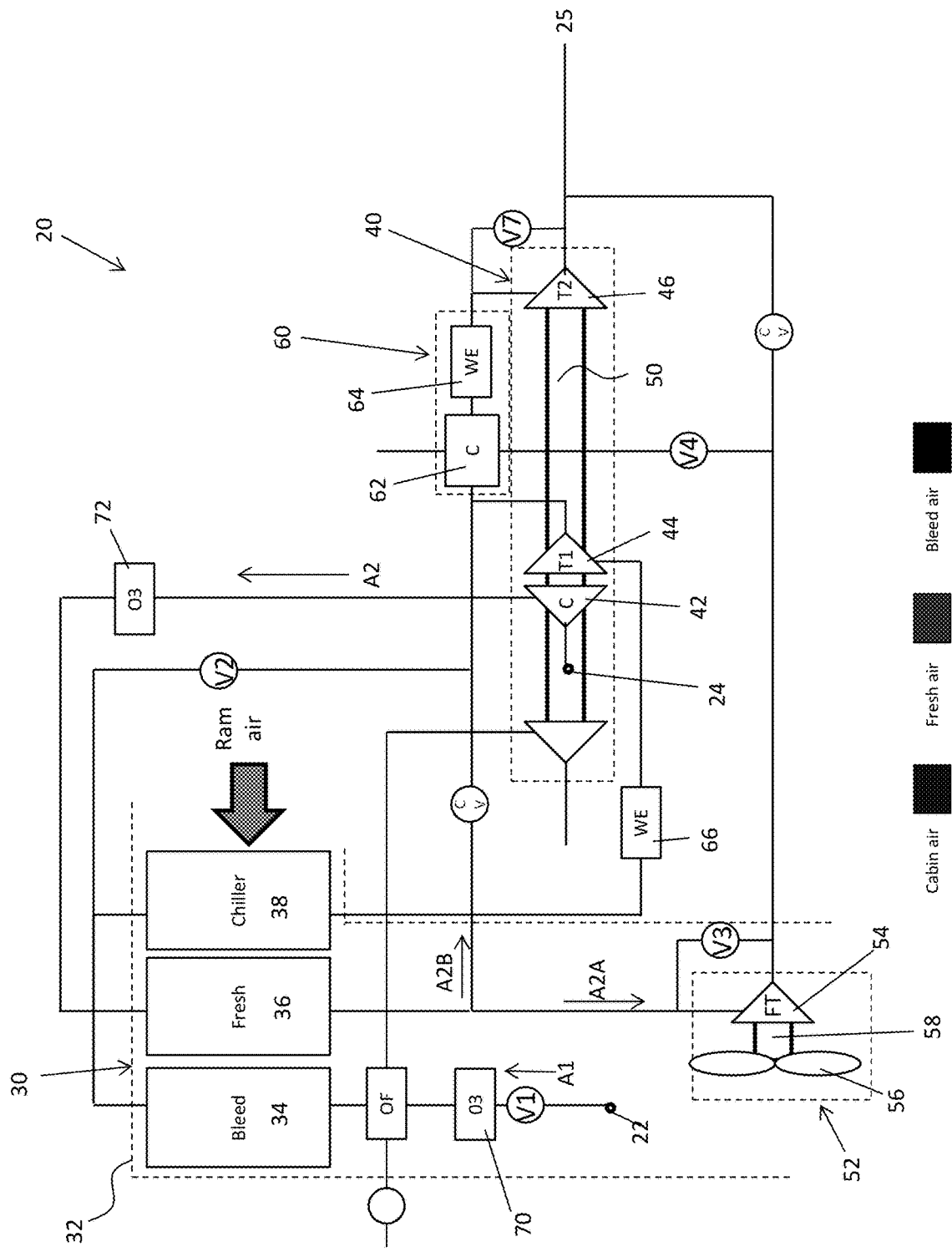
FIG. 2 is a simplified schematic of a system as shown in FIG. 1 operating during ground operation according to an embodiment.

In the first mode, illustrated schematically in FIG. 2, each of valves V2, V3, V5 and V7 are in a closed configuration. Accordingly, in the first mode of operation, a supply of the third medium A3 is not provided to the system 20. Valve V1 is open and a high temperature, high pressure first medium A1 drawn through the inlet port 22 may pass through an ozone converter, illustrated at 70, before being provided to the first heat exchanger 34. Within the first heat exchanger 34, the first medium A1 is cooled via a flow of ram air. The first medium A1 then passes sequentially from the first heat exchanger 34 to the third heat exchanger 38 where the first medium A1 is cooled to a nearly ambient temperature. The process of cooling the first medium in the chiller or third heat exchanger 38 condenses moisture out of the air. Moisture is then removed from the wet first medium A1 within a water extractor 66 of the dehumidification system 60 before being provided to the inlet of the first turbine 44. Within the first turbine 44, the first medium A1 is expanded and work is extracted to power operation of the compressor 42. The additional temperature drop of the first medium that occurs within the first turbine 44 causes moisture within the first medium A1 to condense while maintaining the temperature of the first medium A1 above freezing.

Simultaneously, a supply of second medium A2 drawn from port 24 is compressed within the compressor 42 causing the temperature of the second medium A2 to increase. The second medium A2 output from the compressor 42 passes sequentially through an ozone converter 72 and the second heat exchanger 36 to cool the second medium A2 to about an ambient temperature. Downstream from the second heat exchanger 36, the second medium A2 diverts. A first portion A2A of the second medium A2 is provided to the turbine 54 of the expansion device 52. Within the turbine 54, the first portion A2A of the second medium A2 is expanded and work is extracted, thereby driving operation of the fan 56 which moves ram air through the ram air circuit 30. The first portion A2A of the second medium A2 output from the turbine 54 of the expansion device 52 is then directed to the condenser 62 of the dehumidification system prior to being dumped overboard to ambient or being released into the ram air circuit 30.

A second portion A2B of the second medium A2 is provided from the second heat exchanger 36 of the ram air circuit 30 directly to the condenser 62 of the dehumidification system 60. In an embodiment, the second portion A2B of the second medium A2 combines with the first medium A1 output from the first turbine 44, such that a mixture A4 thereof is provided to the condenser 62 and subsequently to the water extractor 64. Together, the condenser 62 and the water extractor 64 function as a middle pressure water separator. Within the condenser 62, the mixture A4 is arranged in a heat exchanger relationship with the first portion A2A of the second medium A2. As a result, the mixture A4 is cooled and then moisture is removed therefrom in the water extractor 64. From the water extractor 64, the mixture A4 of the first medium A1 and the second portion A2B of the second medium A2 is provided to the second turbine 46 of the compression device 40 where the mixture A4 is expanded and work is extracted, further driving the compressor 42. From the second turbine 46, the mixture A4 is provided to one or more loads of the aircraft. In an embodiment, the output from the second turbine 46 is used to cool the flight deck and cabin. In an embodiment, the mixture A4 provided to the loads of the aircraft has less than 70 grains of moisture per pound of air.

Figure 3:
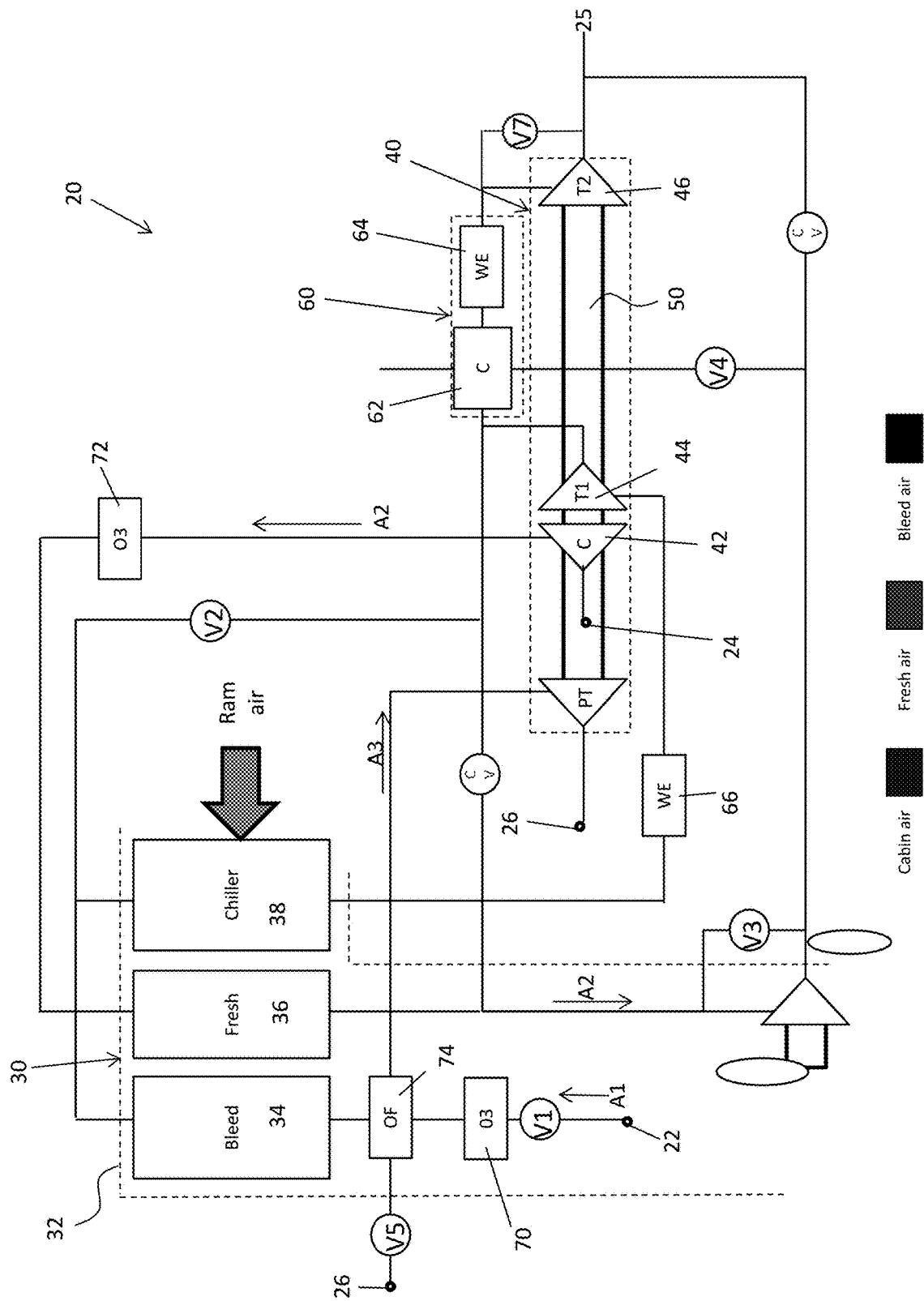
FIG. 3 is a simplified schematic of a system as shown in FIG. 1 operating during cruise operation according to an embodiment.

With reference now to FIG. 3, the system 20 is configured to operate in a second mode when the aircraft is at altitude. The second mode of operation is similar to the first mode. However, additional energy is provided to the compressor 42 of the compression device 40 via the supply of third medium A3 is provided to the power turbine 48 of the compression device 40. The third medium A3 is heated by the first medium A1 in an outflow heat exchanger, illustrated schematically at 74, prior to being supplied to the power turbine 48. Depending on the temperature of the third medium A3 exiting the power turbine 48, the air can be used as a heat sink by dumping the air into the inlet of the ram air circuit 30 or the air can be dumped overboard either directly or via the ram air circuit 30.

In the second mode, the main differences with the first mode are that valve V3 is open, thereby allowing the second medium A2 to bypass the expansion device 52 and the fourth valve V4 is closed so that all of the second medium A2 is provided to the one or more loads of the aircraft and used for cooling. As shown, each of valves V1, V3, and V5 are open, and valves V2, V4, and V7 are closed. A high temperature, high pressure first medium A1 drawn through the inlet port 22 passes through the ozone converter 70 before being supplied to the outflow heat exchanger 74. Within the outflow heat exchanger 74, the first medium is arranged in a heat exchanger relationship with the third medium A3, such that heat is transferred from the hot first medium A1 to the cooler third medium A3. The cooler first medium is then provided to the first heat exchanger 34 and subsequently to the third heat exchanger 38, where the first medium A1 is cooled via a flow of ram air. The moisture that has condensed out of the first medium A1 is collected as the first medium A1 passes through the water extractor 66 of the dehumidification system 60 before being provided to the inlet of the first turbine 44. Within the first turbine 44, the first medium A1 is expanded and work is extracted to power operation of the compressor 42. The additional temperature drop of the first medium that occurs within the first turbine 44 causes moisture within the first medium A1 to condense while maintaining the temperature of the first medium A1 above freezing.

From the outlet of the first turbine 44, the cool first medium A1 passes through the condenser 62 to the water extractor 64. Because no secondary flow is provided to the condenser in the second mode of operation, the condenser is not an active component of the dehumidification system 60. However, moisture is removed from the first medium A1 within the water extractor 64. From the water extractor 64, the first medium A1 is provided to the second turbine 46 of the compression device 40 where the first medium A1 is expanded and work is extracted. From the outlet of the second turbine 46, the first medium A1 is mixed with the second medium A2 prior to being provided to one or more loads of the system or aircraft.

At the same time, a supply of second medium A2 drawn from port 24 is compressed within the compressor 42 causing the temperature of the second medium A2 to increase. The second medium A2 output from the compressor 42 passes sequentially through the ozone converter 72 and the second heat exchanger 36 to cool the second medium A2 to about an ambient temperature. Unlike the first mode of operation, the flow of the second medium A2 is not divided into multiple paths. Rather, because valve V3 is open, the entirety of the flow of second medium A2 bypasses the expansion device 52 and is provided downstream from the outlet of the second turbine 46 for mixture with the first medium A1 and to be provided to one or more loads of the system or aircraft.

Figure 4:
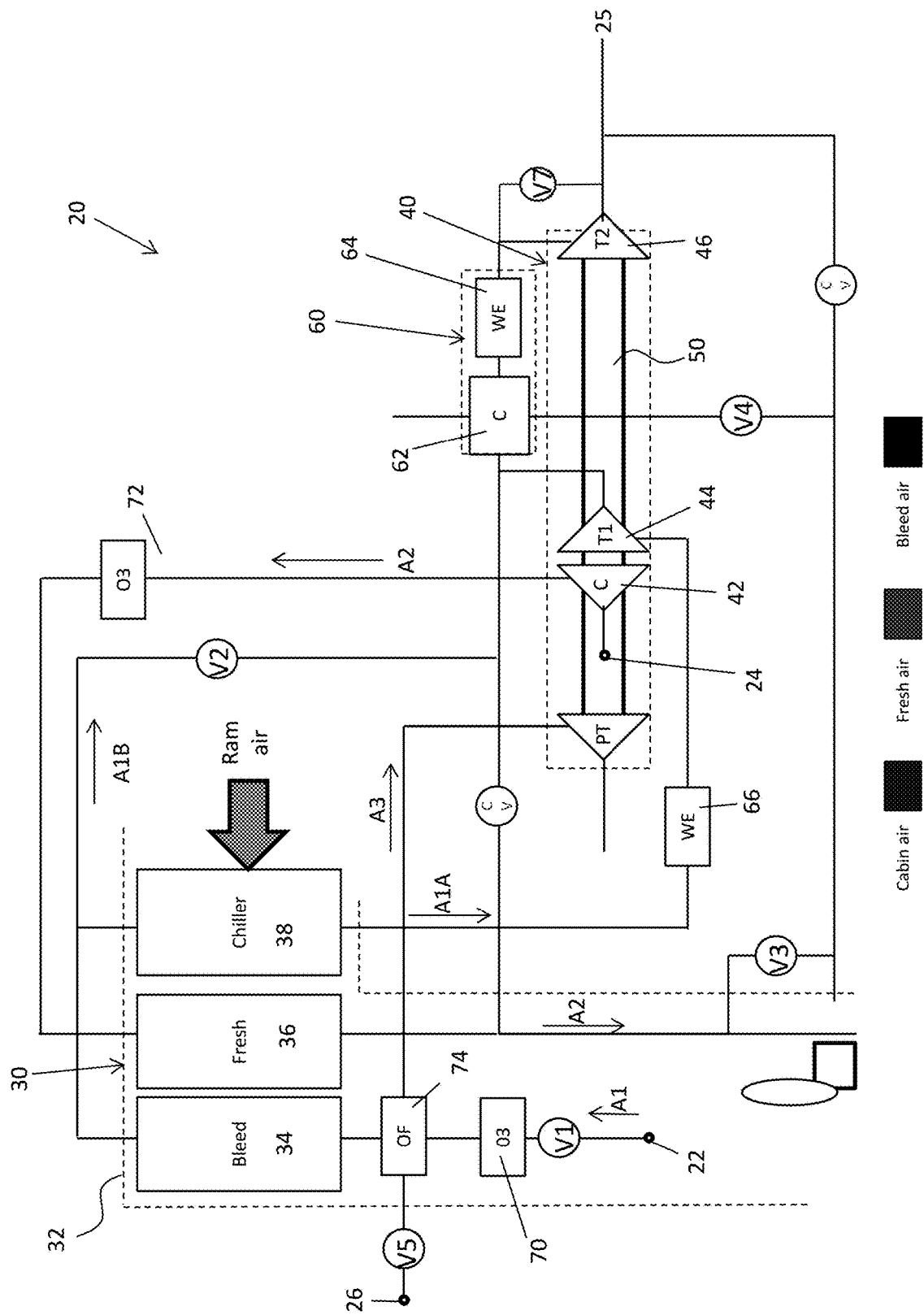
FIG. 4 is a simplified schematic of a system as shown in FIG. 1 operating during single pack cruise operation according to an embodiment.

The system 20 is configured to operate in a third mode during a failure of the environmental control system, such as when only a single ECS pack 20, for example the pack shown in the FIGS., is operational. The third mode of operation, as illustrated schematically in FIG. 4, is similar to the second mode; however in the third mode, valve V2 is open. As a result, a first portion A1A of the output from the first heat exchanger 34 is provided to the third heat exchanger 38 and the remainder of the system 20 in a manner as previously described. A second portion A1B of the first medium A1 is configured to bypass the third heat exchanger 38, the water extractor 66 and the first turbine 44. The first portion A1A and the second portion A1B of the first medium A1 mix upstream from the dehumidification system 60. By opening valve V2, the temperature of the first medium A1 provided to the second turbine 46 is increased and more power is provided to the compression device 40 compared to other modes of operation.

Figure 5:
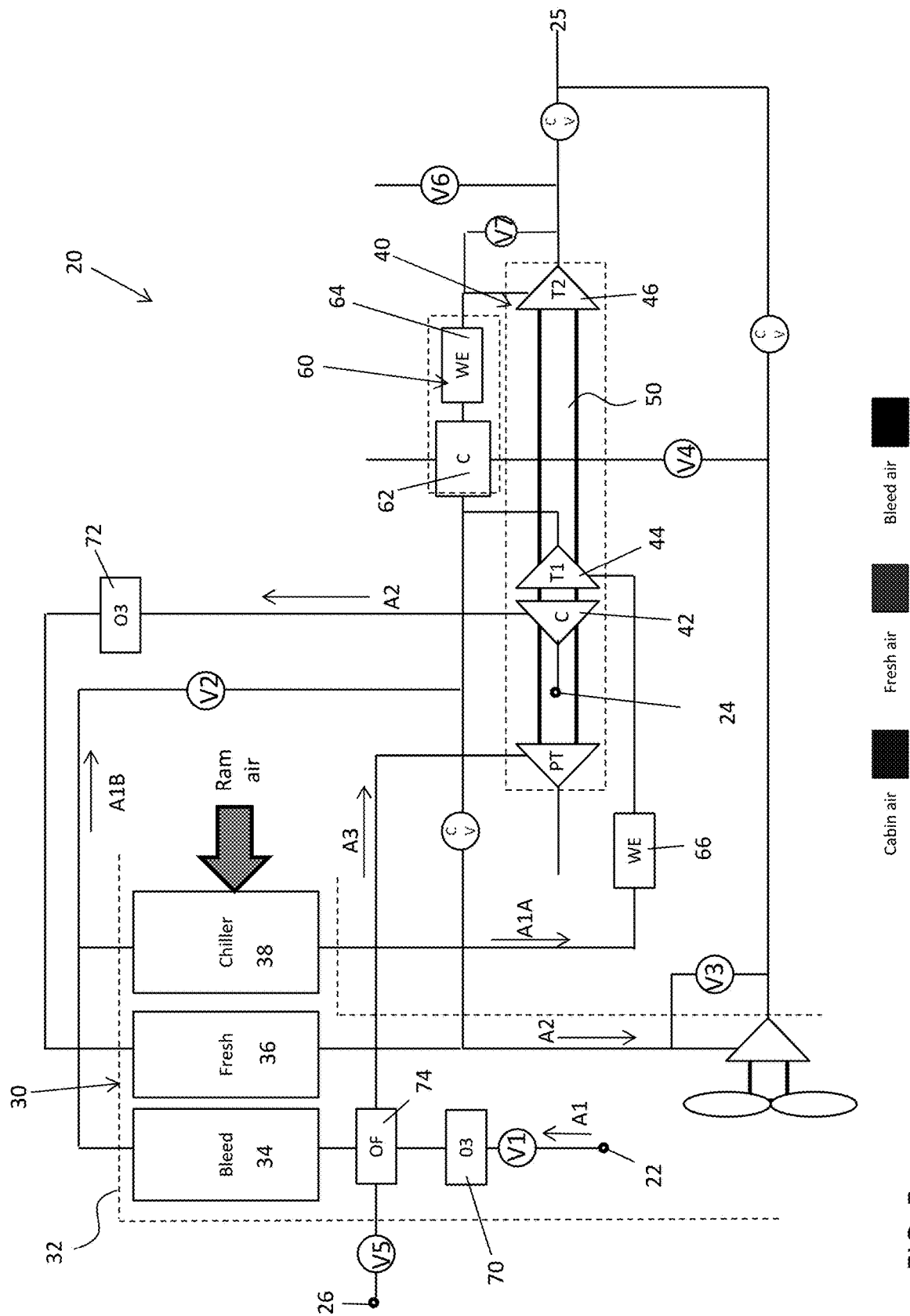
FIG. 5 is a simplified schematic of a system as shown in FIG. 1 operating in a 100% fresh air mode according to an embodiment.

With reference now to FIG. 5, the system is configured to operate in a fourth mode. In the illustrated, non-limiting embodiment, the fourth mode is a "Fresh air" mode where only fresh air is distributed from the system 20 to one or more downstream loads. The fourth mode of operation is similar to the third mode except that in the fourth mode, valve V6 is open. As a result, the mixture of partially cooled and fully cooled first medium A1 output from the second turbine 46 may be dumped overboard or may be used as a heat sink by dumping the first medium into the ram air circuit 30.

A first portion A1A of the output from the first heat exchanger 34 is provided to the third heat exchanger 38 and the remainder of the system 20 in a manner as previously described. A second portion A1B of the first medium A1 is configured to bypass the third heat exchanger 38, the water extractor 66 and the first turbine 44. The first portion A1A and the second portion A1B of the first medium A1 mix upstream from the dehumidification system 60. By opening valve V2, the temperature of the first medium A1 provided to the second turbine 46 is increased and more power is provided to the compression device 40 compared to other modes of operation. Further, a check valve may be arranged within the fluid flow line at a position between the connection of the outlet of the second turbine 46 and the conduit extending from valve V3. The check valve restricts the flow of the first medium there through, while preventing a back flow of the second medium toward the second turbine 46.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
   a ram air circuit including a ram air shell having a plurality of heat exchangers positioned therein, wherein the plurality of heat exchangers includes at least a first heat exchanger and a second heat exchanger directly connected to an outlet of the first heat exchanger, such that a flow of first medium is provided to the first heat exchanger and the second heat exchanger in series;
   a dehumidification system arranged in fluid communication with the ram air circuit; and
   a compressing device arranged in fluid communication with the ram air circuit and the dehumidification system, the compressing device includes a compressor and a first turbine coupled to one another via a shaft, an inlet of the first turbine being fluidly connected to an outlet of the second heat exchanger, wherein during operation of the first turbine, work is extracted from the first medium within the first turbine to power the compressor; and
   wherein at an outlet of the first turbine, a temperature of the first medium is above freezing and at least a portion of the moisture within the first medium is condensed;
   wherein the environmental control system is operable in a plurality of modes, and in a first mode, a second medium is provided to the compressor and a mixture including at least a portion of the second medium output from the compressor and the first medium output from the first turbine is provided to the dehumidification system.

2. The environmental control system of claim 1, wherein the compression device further comprises a second turbine arranged in fluid communication with the dehumidification system.

3. The environmental control system of claim 2, wherein during operation of the environmental control system in the first mode, the mixture output from the dehumidification system is provided to the second turbine.

4. The environmental control system of claim 2, further comprising an expansion device located separate from the compression device and arranged in fluid communication with the ram air circuit and the dehumidification system.

5. The environmental control system of claim 4, wherein the expansion device further comprises another turbine operably coupled to a fan by another shaft, the fan being located within the ram air shell such that operation of the fan moves air through the ram air circuit.

6. The environmental control system of claim 4, wherein during operation of the environmental control system in the first mode, another portion of the second medium is provided to the expansion device and then to the dehumidification system, wherein within the dehumidification system, the another portion of the second medium is arranged in a heat exchange relationship with the mixture.

7. The environmental control system of claim 6, wherein during operation of the environmental control system, the another portion of the second medium is output from the dehumidification system overboard.

8. The environmental control system of claim 6, wherein during operation of the environmental control system, the another portion of the second medium is output from the dehumidification system into the ram air circuit.

9. The environmental control system of claim 4, further comprising a first bypass valve associated with the expansion device, wherein during operation of the environmental control system in a second mode, the first bypass valve is open such that at least a portion of the second medium output from the compressor bypasses the expansion device and the dehumidification system.

10. The environmental control system of claim 9, wherein during operation of the environmental control system in the second mode, the first medium and the second medium are mixed prior to being distributed to a downstream load.

11. The environmental control system of claim 9, further comprising a second bypass valve associated with the first turbine of the compression device, wherein during operation of the environmental control system in a third mode, the second bypass valve is open such that at least a portion of the first medium is provided from the ram air circuit directly to the dehumidification system.

12. The environmental control system of claim 11, wherein during operation of the environmental control system in the third mode, another portion of the first medium is provided from the ram air circuit to the first turbine, wherein the portion of the first medium and the another portion of the first medium rejoin at a location upstream from the dehumidification system.

13. The environmental control system of claim 11, further comprising a third bypass valve arranged downstream from an outlet of the second turbine.

14. The environmental control system of claim 13, wherein during operation of the environmental control system in a fourth mode, the third bypass valve is open such that the first medium output from the second turbine flows through the third bypass valve and is dumped overboard or into the ram air circuit.

15. The environmental control system of claim 14, wherein during operation of the environmental control system in the fourth mode, only the second medium is provided to a downstream load.

16. The environmental control system of claim 1, wherein the environmental control system is operable in the first mode when the aircraft is on the ground or at low altitude.

17. The environmental control system of claim 1, wherein the compression device further comprises a power turbine coupled to the shaft, the environmental control system being operable in a plurality of modes such that in at least one mode, a third medium is provided to the power turbine.

18. The environmental control system of claim 17, wherein the first medium is bleed air, the second medium is fresh air, and the third medium is cabin discharge air.

19. An environmental control system of an aircraft comprising:
- a ram air circuit including a ram air shell having at least one heat exchanger positioned therein;
- a dehumidification system arranged in fluid communication with the ram air circuit; and
- a compressing device arranged in fluid communication with the ram air circuit and the dehumidification system, the compressing device including a compressor, a first turbine, and a power turbine coupled to one another via a shaft, wherein during operation of the first turbine, work is extracted from a first medium within the first turbine to power the compressor and a second medium is compressed within the compressor;
- wherein at an outlet of the first turbine, a temperature of the first medium is above freezing and at least a portion of the moisture within the first medium is condensed;
- wherein the environmental control system is operable in a plurality of modes, and in at least one mode, a third medium is provided to the power turbine, and in at least one mode a mixture including at least a portion of the second medium output from the compressor and the first medium output from the first turbine is provided to the dehumidification system.

\* \* \* \* \*